United States Patent [19]

Kobayashi et al.

[11] Patent Number: 4,584,353
[45] Date of Patent: Apr. 22, 1986

[54] POLYESTER BLOCK COPOLYMER COMPOSITION

[75] Inventors: Takuma Kobayashi; Hironobu Kitagawa; Chikara Sugitawa; Shigeo Kobayashi, all of Otsu, Japan

[73] Assignee: Toyo Boseki Kabushiki Kaisha, Osaka, Japan

[21] Appl. No.: 660,618

[22] Filed: Oct. 15, 1984

Related U.S. Application Data

[62] Division of Ser. No. 497,470, May 23, 1983, abandoned.

[30] Foreign Application Priority Data

May 26, 1982 [JP]  Japan .................. 57-90201

[51] Int. Cl.⁴ ................. C08L 67/02; C08L 67/04
[52] U.S. Cl. .................... 525/438; 525/444; 525/411
[58] Field of Search ............. 525/438, 444, 437, 408

[56] References Cited

U.S. PATENT DOCUMENTS

| | | | |
|---|---|---|---|
| 2,863,855 | 12/1958 | Wilson | 521/177 |
| 3,560,605 | 2/1971 | Siggel | 525/438 |
| 3,657,191 | 4/1972 | Titzmann | 525/437 |
| 3,869,427 | 3/1975 | Meschke | 525/437 |
| 3,886,104 | 5/1975 | Borman | 525/438 |
| 3,907,926 | 9/1975 | Brown et al. | 525/444 |
| 4,011,285 | 2/1977 | Seymour et al. | 525/444 |
| 4,016,142 | 4/1977 | Alexander | 525/437 |
| 4,031,165 | 6/1977 | Saiki et al. | 525/444 |
| 4,130,541 | 12/1978 | Lazarus | 528/273 |
| 4,144,285 | 3/1979 | Maschek | 528/273 |
| 4,222,928 | 9/1980 | Kawamura | 525/438 |
| 4,229,553 | 10/1980 | Sterzel | 525/438 |
| 4,246,378 | 1/1981 | Kometami | 525/438 |
| 4,315,882 | 2/1982 | Hiratsuka et al. | 525/444 |
| 4,374,960 | 2/1983 | Rothwell | 525/436 |

FOREIGN PATENT DOCUMENTS 2039510  8/1980  United Kingdom ........... 525/444

Primary Examiner—John C. Bleutge
Assistant Examiner—Patricia Short

[57] ABSTRACT

An improved polyester block copolymer composition having a rubber-like elasticity, particularly having excellent moldability, impact resistance, heat resistance and water resistance, which comprises a polyester block copolymer produced from a crystalline aromatic polyester and a lactone in melt-admixture with a polytetramethylene terephthalate and optionally further with at least one epoxy compound.

5 Claims, No Drawings

POLYESTER BLOCK COPOLYMER COMPOSITION

This is a division of application Ser. No. 497,470, filed May 23, 1983, now abandoned.

The present invention relates to an improved polyester block copolymer composition having a rubber-like elasticity, more particularly, to an improvement in moldability, impact resistance, heat resistance and water resistance of a polyester type block copolymer produced by reacting an aromatic polyester and a lactone.

Polyester block copolymers produced by reacting an aromatic polyester and a lactone, so-called polyester elastomers, have recently been noticed as a useful material for various utilities because of their excellent properties such as heat resistance, light resistance, low-temperature characteristics, or the like. It is well known to produce the polyester block copolymers by reacting an aromatic polyester and a lactone, for example, by reacting a crystalline aromatic polyester and a lactone (cf. Japanese Patent Publication No. 4116/1973); by reacting a crystalline aromatic polyester and a lactone, followed by reacting the resulting block prepolymer with a polyfunctional acylating agent to extend the chain of the polymer (cf. Japanese Patent Publication No. 4115/1973); or by polymerizing a lactone in the presence of a crystalline aromatic polyester in solid state (cf. Japanese Patent Publication No. 49037/1977). However, because of their lower viscosity and lower heat distortion temperature, these known polymers are restricted in their utilities. For instance, when they are used for injection molding, because of lower viscosity, many mold flashes occur, and further, because of lower heat distortion temperature, the molded products are easily deformed by knockout pin in short cooling time.

It is also known that an inorganic filler such as talc is added to the polyesters as a nucleating agent in order to improve the moldability of the polyesters. According to this method, the Vicat softening temperature and crystallization temperature thereof may be improved, but the tensile strength at break thereof is significantly decreased. Besides, the viscosity of the polymers can not be increased by the addition of an inorganic filler.

The present inventors have intensively studied an improved method for obtaining a polyester composition having improved moldability. As a result, it has been found that a polytetramethylene terephthalate is effective for such a purpose.

Polytetramethylene terephthalate has excellent mechanical characteristics such as excellent tenacity, wear resistance, etc. and hence is usually used for various molding products as an engineering plastic. However, this resin has drawbacks such as inferior impact resistance and inferior low-temperature characteristics, or the like. In order to eliminate such drawbacks, it has been tried to incorporate thereto elastic resins such as various rubbers or polyurethane elastomers, but it results in lowering of mechanical characteristics such as tenacity and wear resistance, because of less compatibility and less affinity between the resins.

Nevertheless, it has been found that when a polyester block copolymer produced by reacting a crystalline aromatic polyester and a lactone is incorporated with a polytetramethylene terephthalate, there can be obtained a composition having excellent moldability, impact resistance, and other properties without deteriorating the mechanical characteristics of the polytetramethylene terephthalate.

An object of the present invention is to provide an improved polyester block copolymer composition having improved moldability in addition to other excellent properties. Another object of the invention is to provide an improvement of polyester block copolyester compositions in various properties such as impact resistance, flexibility, moldability, low-temperature characteristics or the like by incorporating a polytetramethylene terephthalate without deterioration of the mechanical characteristics of the polytetramethylene terephthalate. A further object of the invention is to provide a polyester block copolymer composition having improved heat resistance, water resistance and impact resistance. A still further object of the invention is to provide a further improvement of additional properties of a polyester block copolymer composition by incorporating a combination of a polytetramethylene terephthalate and an epoxy compound. These and other objects and advantages of the present invention will be apparent to persons skilled in the art from the following description.

In one embodiment, the desired improved polyester block copolymer composition of the present invention comprises 2 to 95 parts by weight of a polyester block copolymer produced by reacting a crystalline aromatic polyester and a lactone and 98 to 5 parts by weight of a polytetramethylene terephthalate.

In another embodiment, the desired improved polyester block copolymer composition comprises 2 to 95 parts by weight of a polyester block copolymer produced by reacting a crystalline aromatic polyester and a lactone and 98 to 5 parts by weight of a polytetramethylene terephthalate and further an epoxy compound in an amount of 0.2 to 10% by weight based on the weight of the composition.

The composition comprising a polyester block copolymer and a polytetramethylene terephthalate of the present invention has excellent heat resistance and light resistance and has also high heat distortion temperature and high crystallization temperature, and hence, it has high melt viscosity and wide range of hardness (i.e. desired hardness being freely selective), and it can easily be used for not only injection molding but also extrusion molding, which means that the composition of the present invention is useful for wider fields of utilities. Moreover the composition of the present invention has superior impact resistance in comparison with a conventional polyester block copolymer.

The polyester block copolymer and the polytetramethylene terephthalate have excellent compatibility, and hence, the composition of the present invention can give good molded products without occurrence of undesirable lamellar peeling. The molded products produced from the composition of the present invention are also characteristic in excellent gloss of surface thereof.

Besides, both resins used in the composition of the present invention are a polyester type resins, and have excellent affinity and compatibility between them, and hence, the composition can show improved various properties such as impact resistance, flexibility, moldability, low-temperature characteristics or the like without deteriorating the peculiar mechanical characteristics of the polytetramethylene terephthalate. Moreover, by incorporating an epoxy compound in addition to the polytetramethylene terephthalate to the polyester block copolymer, there can be obtained a polyester elastomer having excellent heat resistance, hydrolysis resistance and impact resistance.

The crystalline aromatic polyester used in the present invention is a polymer being predominantly formed by ester linkages or a combination of ester linkage and ether linkages which has a main repeating unit of at least one aromatic group and has a terminal hydroxy group. The crystalline aromatic polyester has preferably a melting point of 150° C. or higher in case of a high degree of polymerization. For the purpose of utilizing the final composition as a molding material, the crystalline aromatic polyester has preferably a molecular weight of not less than 5,000, more preferably not less than 8,000. For the purpose of utilizing the final composition as an adhesive or coating material, the polyester may have a molecular weight of less than 5,000.

Suitable examples of the crystalline aromatic polyester are homopolyesters such as polyethylene terephthalate, polytetramethylene terephthalate, poly-1,4-cyclohexylenedimethylene terephthalate, polyethylene 2,6-naphthalate; polyester ethers such as polyethylene hydroxybenzoate, poly-p-phenylene bishydroxyethoxyterephthalate; copolyesters or copolyester ethers which comprise mainly tetramethylene terephthalate unit or ethylene terephthalate unit and other copolymer components such as tetramethylene or ethylene isophthalate unit, tetramethylene or ethylene adipate unit, tetramethylene or ethylene sebacate unit, 1,4-cyclohexylenedimethylene terephthalate unit, or tetramethylene or ethylene p-hydroxybenzoate unit, or the like. In case of copolymers they contain preferably 60 molar % or more of tetramethylene terephthalate unit or ethylene terephthalate unit.

The lactone is most preferably ε-caprolactone, but other lactones such as enantholactone or caprilolactone may also be used. Two or more lactones may be used together.

The above crystalline aromatic copolyester and lactone can be copolymerized in an appropriate ratio, which depends on the kinds of utilities of the final composition. Generally, when the amount of the aromatic polyester is larger, the polymer becomes harder and shows more improved mechanical characteristics such as strength, and on the other hand, when the amount of the lactone is larger, the polymer becomes softer and shows more improved properties at a low temperature. Accordingly, it is preferably to use the aromatic polyester/lactone in the ratio of 95/5 to 5/95 by weight, more preferably 80/20 to 30/70 by weight.

The reaction of the crystalline polyester and the lactone for producing the desired polyester type block copolymer may be carried out in the presence or absence of a catalyst.

The polytetramethylene terephthalate used in the present invention may be homopolyesters or may be copolyesters comprising mainly a tetramethylene terephthalate unit and units of other copolymerizable components such as ethylene terephthalate unit, tetramethylene isophthalate unit, tetramethylene adipate unit, tetramethylene sebacate unit, 1,4-cyclohexylene dimethylene terephthalate unit, etc. The copolyesters comprises 80 molar % or more of the tetramethylene terephthalate unit.

The composition of the present invention comprises 2 to 95 parts by weight of the polyester block copolymer and 98 to 5 parts by weight of the polytetramethylene terephthalate. When the amount of the polyester block copolymer is less than 2 parts by weight and the amount of the polytetramethylene terephthalate is over 98 parts by weight, the product obtained from the composition shows significantly decreased Izod impact strength and does not show any improvement in impact resistance of the polytetramethylene terephthalate. On the other hand, when the amount of the polyester block copolymer is over 95 parts by weight and the amount of the polytetramethylene terephthalate is less than 5 parts by weight, the composition show a low crystallization temperature and does not show any improvement in moldability and also in Vicat softening point.

The composition comprising 25 to 95 parts by weight of a polyester block copolymer, said copolymer having a lactone content of 5 to 95% by weight, preferably 20 to 70% by weight, and 75 to 5 parts by weight of a polytetramethylene terephthalate is particularly excellent in moldability and impact resistance. The composition comprising 2 to 24 parts by weight of a polyester block copolymer, said copolymer having a lactone content of 20 to 70% by weight, preferably 25 to 50% by weight, and 98 to 76 parts by weight of a polytetramethylene terephthalate has greatly improved properties such as excellent impact resistance, flexibility, moldability, low-temperature characteristics, etc. without deteriorating the excellent mechanical characteristics of the polytetramethylene terephthalate.

The epoxy compound used in the present invention is not specifically restricted as far as it has at least one epoxy group within the molecule. Suitable epoxy compounds are the compounds of the following formulae (I), (II) and (III):

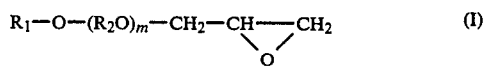

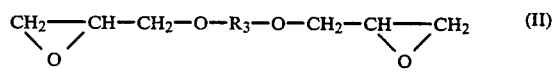

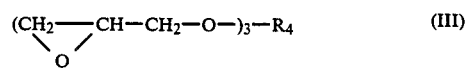

wherein $R_1$ is a hydrocarbon group having 1 to 10 carbon atoms, $R_2$ is an alkylene group having 1 to 4 carbon atoms, $R_3$ is a divalent hydrocarbon group having 1 to 20 carbon atoms or $-(R_2O)_m-R_2-$, $R_4$ is a trivalent hydrocarbon group having 3 to 20 carbon atoms, and m is an integer of 0 to 20.

Suitable examples are methyl glycidyl ether, phenyl glycidyl ether, ethylene glycol diglycidyl ether, diethylene glycol diglycidyl ether, polyethylene glycol monophenyl monoglycidyl ether, glycerine triglycidyl ether, or the like.

The above epoxy compounds have preferably an epoxy value of 0.9 to 14 equivalent/kg.

Di- or more functional epoxy compounds, e.g. di- or tri-functional epoxy compounds of the formulae (II) and (III) are preferably used, and optionally, monoepoxy compound is used together.

The required amount of the epoxy compound depends on the amount of terminal groups of the polyester block copolymer and polytetramethylene terephthalate, but is usually in the range of 0.2 to 10% by weight, preferably 0.4 to 4% by weight, based on the weight of the polyester block copolymer and polytetramethylene terephthalate. When the amount is smaller than 0.2% by weight, the effect of the epoxy compound on the improvement of heat aging resistance and hydrolysis resistance is less exhibited, but on the other hand, when the amount is over 10% by weight, the molded product obtained from the final composition shows disadvantageously crude surface due to the unreacted epoxy compound. Particularly, it is preferable to incorporate a mono-functional epoxy compound in an amount of 0.1 to 5% by weight and a di- or more functional epoxy compound in an amount of 0.1 to 9.9% by weight.

When the epoxy compound is melt-admixed with the polyester block copolymer and polytetramethylene terephthalate, the reaction of the polyester block copolymer and polytetramethylene terephthalate with the epoxy compound may be carried out without using any catalyst, but is remarkably promoted by using a catalyst. The catalyst includes all conventional catalyst which are usually used in a reaction of epoxy compounds, for example, amines, phosphorus compounds, and a salt of a mono- and/or di-carboxylic acid having 10 or more carbon atoms with a metal of the group I-a or II-a in periodic table. Particularly suitable examples of the catalyst are trivalent phosphorus compounds such as tributylphosphine and triphenylphosphine. These catalysts may be used in combination of two or more thereof. The above epoxy compounds and catalysts may be added to the reaction system either at one time or in portionwise.

The improved polyester block copolymer composition of the present invention can be prepared by conventional methods, for example, by mixing polyester block copolymer chips with polytetramethylene terephthalate, an epoxy compound, catalyst and other additives and uniformly melt-admixing with heating. The melt-admixing is preferably carried out at a temperature of 3° C. higher than the melting point of the crystalline elastomer to 280° C. for about 30 seconds to 120 minutes. The mixing period may vary according to the kinds of mixing methods and temperature. During the melt-mixing, various additives such as pigments, stabilizers and the like may added added to the composition without giving no bad effect on the improvement of hydrolysis resistance, heat aging resistance, and impact resistance.

The polyester block copolymer composition of the present invention shows excellent moldability, impact resistance, heat resistance and water resistance, and hence, can be used for various utilities, such as injection moldings, blow moldings and extrusion moldings useful as parts of various machines and other molding products, such as name plates, automobile parts, switches, holders, hooks, packings, resin springs, fastener, various coverings, gears, belts, rolls, bottles, tubes, hoses, films, sheets, vibration insulators or dampers, coatings (e.g. wire coatings), and the like.

The present invention is illustrated by the following Examples but should not be construded to be limited thereto. In Examples, the various properties were measured in the following methods.

(1) Reduced specific viscosity

It was measured under the following conditions:
Solvent: Phenol/tetrachloroethane (6/4 by weight)
Concentration: 50 mg/25 ml
Temperature: 30° C.

(2) Melt viscosity

It was measured by at 240° C. under a load of 50 kg/cm$^2$ with a Koka flow tester.

(3) Melting and crystallization temperature

The melting temperature is shown by an endotherm peak when a sample was heated with raising the temperature at a rate of 20° C./minute with a differential scanning calorimeter (manufactured by Perkin-Elemmer Co.), and the crystallization temperature is shown by an exotherm peak when the sample was cooled from the temperature 20° C. higher than the melting point at a cooling rate of $-20°$ C./minutes.

(4) Thermal deformation temperature

It was measured the method as defined in Japan Industrial Standards (JIS) K7207.

(5) Vicat softening point

It was measured by the method as defined in Japanese Industrial Standards (JIS) K7206.

(6) Tensile strength, tensile elongation and elastic modulus in tension

The starting chips were pressed with heat-pressing to form a plane plate (thickness: 2 mm), which was punched to obtain a Dumbbell-shaped test piece. The test piece was drawn at a rate of 50 mm/minute, and the weight (kg) of load was measured at break of the test piece. The tensile strength (kg/cm$^2$) was shown by a value obtained by dividing the load (kg) at break by the initial sectional area (cm$^2$) of the test piece. The tensile elongation (%) was shown by a ratio of elongation of test piece at break to the length of the starting test piece. Besides, the elastic modulus in tension was calculated from a curve of the stress-elongation at this time.

(7) Izod impact strength (with notch)

It was measured by the method as defined in ASTM D256.

PREPARATION 1

Polytetramethylene terephthalate (70 kg) and ε-caprolactone (30 kg) were charged into a reactor. After purging the reactor with nitrogen gas, the mixture was melt-reacted with stirring at 230° C. for 2 hours. The unreacted ε-caprolactone was removed in vacuum. The polyester elastomer (A) thus obtained had a reduced specific viscosity of 1.163, and further had a tensile strength at break of 371 kg/cm$^2$ and a tensile elongation at break of 708%.

PREPARATION 2

Polytetramethylene terephthalate (50 kg) and ε-caprolactone (50 kg) were charged into a reactor. After purging the reactor with nitrogen gas, the mixture was melt-reacted with stirring at 230° C. for 2 hours. The unreacted ε-caprolactone was removed in vacuum. The polyester elastomer (B) thus obtained had a reduced specific viscosity of 1.35, and further had a tensile strength at break of 235 kg/cm$^2$ and a tensile elongation at break of 803%.

EXAMPLE 1

The polyester type block copolymer chips (8 kg) prepared in Preparation 1 and polytetramethylene terephthalate ($\eta sp/c = 1.13$) (2 kg) were charged into a drum tumbler, and the mixture was stirred at room temperature for 30 minutes. The resulting mixture was extruded with a biaxial extruder (40 mm$\phi$). After cooling with water, the extruded product was cut to give chips. The resulting chips had a reduced specific viscosity of 1.160, a tensile strength at break of 368 kg/cm² and a tensile elongation at break of 625%.

EXAMPLE 2

The polyester type block copolymer (5 kg) prepared in Preparation 1 and polytetramethylene terephthalate ($\eta$sp/c=1.13) (5 kg) were charged into a drum tumbler, and the mixture was stirred at room temperature for 30 minutes and treated with a biaxial extruder in the same manner as described in Example 1. The chips thus obtained had a reduced specific viscosity of 1.162, a tensile strength at break of 376 kg/cm² and a tensile elongation at break of 433%.

REFERENCE EXAMPLE 1

The polyester type block copolymer (8 kg) prepared in Preparation 1 and talc (2 kg) were charged into a drum tumbler, and the mixture was stirred for 30 minutes and treated in the same manner as described in Example 2. The chips thus obtained had a reduced specific viscosity of 1.161, a tensile strength at break of 178 kg/cm² and a tensile elongation at break of 495%.

EXAMPLE 3

The chips prepared in Examples 1 and 2 and Reference Example 1 were dried at 100° C. in vacuum and then were formed into a sheet (thickness: 2 mm) with hot-pressing. The hardness and tensile strength at break and tensile elongation at break of the sheet thus obtained were measured. The results are shown in Table 1.

TABLE 1

| Ex. No. | Tensile strength at break (kg/cm²) | Tensile elongation at break (%) | Elastic modulus at tension (kg/cm²) | Hardness (JIS A) | Hardness (Shore D) |
|---|---|---|---|---|---|
| Preparn. 1 | 371 | 708 | 2311 | 95 | 56 |
| Ex. 1 | 368 | 625 | 3519 | 96 | 65 |
| Ex. 2 | 376 | 433 | 4861 | 97 | 72 |
| Ref. Ex. 1 | 178 | 495 | 5660 | 98 | 67 |

EXAMPLE 4

The chips prepared in Preparation 1, Examples 1 and 2, and Reference Example 1 were molded with an injection molding machine to prepare a test piece for measuring the thermal deformation temperature. The thermal deformation temperature as well as melting temperature, crystallization temperature and viscosity of the test pieces were measured in the methods as mentioned hereinbefore. The results are shown in Table 2.

TABLE 2

| Ex. No. | Thermal deformation temp. (°C.) | Vicat softening temp. (°C.) | DSC melting point (°C.) | DSC crystallization temp. (°C.) | Melt viscosity at 240° C. (pois) |
|---|---|---|---|---|---|
| Preparn. 1 | 102.5 | 187.5 | 208.5 | 159.0 | 1300 |
| Ex. 1 | 115.5 | 194.0 | 207.5 | 163.0 | 3050 |
| Ex. 2 | 143.8 | 204.5 | 211.5 | 178.5 | 8500 |
| Ref. Ex. 1 | 103.6 | 205.4 | 212.0 | 180 | 1270 |

Besides, the molded products obtained from the chips prepared in Example 1 and Example 2 showed an Izod impact strength (with notch) of 16.7 kg.cm/cm and 8.7 kg.cm/cm, respectively. The molded product obtained from the polytetramethylene terephthalate shows an Izod impact strength (with notch) of 3.4 kg.cm/cm.

EXAMPLE 5

The polyester type block copolymer chips prepared in Preparation 1 or 2 and polytetramethylene terephthalate ($\eta$sp/c=1.13) were charged into a drum tumbler, and the mixture was stirred at room temperature for 30 minutes. The resulting mixture was extruded with a biaxial extruder (40 mm$\phi$). After cooling with water, the extruded product was cut to give chips. The reducing specific viscosity, tensile strength at break and tensile elongation at break of the resulting chips are shown in Table 3.

The chips obtained above were dried at 100° C. in vacuum and then were formed into a sheet (thickness: 2 mm) with hot-pressing, and the elastic modulus in tension thereof was measured. The results are shown in Table 3. Moreover, the chips were molded with an injection molding machine to prepare a test piece for measuring Izod impact strength, and the Izod impact strength was measured in the method as described hereinbefore. The results are also shown in Table 3.

TABLE 3

| | PBT (part by weight) | Polyester type block copolymer (part by weight) | Reducing specific viscosity | Tensile strength at break (kg/cm²) | Tensile elongation at break (%) | Elastic modulus at tension (kg/cm²) | Izod impact strength (kg cm/cm) |
|---|---|---|---|---|---|---|---|
| 1 | — | (A) 100 | 1.163 | 371 | 708 | 2311 | 48.0 |
| 2 | — | (B) 100 | 1.35 | 235 | 803 | 743 | 55.0 (No Break) |
| 3 | 100 | — | 1.13 | 570 | 120 | 22080 | 3.4 |
| 4 | 80 | (A) 20 | 1.137 | 365 | 373 | 13000 | 6.7 |
| 5 | 80 | (B) 20 | 1.173 | 318 | 385 | 8600 | 8.0 |
| 6 | 90 | (B) 10 | 1.154 | 447 | 280 | 13700 | 6.3 |

EXAMPLE 6

The polyester type block copolymer chips prepared in Preparation 1 (5 kg), polytetramethylene terephthalate ($\eta$sp/c=1.13) (5 kg), phenyl glycidyl ether (200 g) and triphenylphosphine (10 g) were charged into a drum tumbler, and the mixture was stirred at room temperature for 30 minutes. The resulting mixture was extruded with a biaxial extruder (40 mm$\phi$) at 230° C. After cooling with water, the extruded product was cut to give chips. The reducing specific viscosity, tensile strength at break, tensile elongation at break, elastic modulus at tension and Izod impact strength of the resulting chips are shown in Table 4.

EXAMPLE 7

The polyester type block copolymer chips prepared in Preparation 1 (5 kg), polytetramethylene terephthalate ($\eta$sp/c=1.13) (5 kg), phenyl glycidyl ether (100 g), diethyleneglycol diglycidyl ether (70 g) and triphenylphosphine (10 g) were charged into a drum tumbler, and the mixture was treated in the same manner as described in Example 6. The reducing specific viscosity, tensile strength at break, tensile elongation at break, elastic modulus at tension and Izod impact strength of the resulting chips are shown in Table 4.

EXAMPLE 8

The polyester type block copolymer chips prepared in Preparation 1 (5 kg), polytetramethylene terephthalate ($\eta$sp/c=1.13) (5 kg), diethyleneglycol diglycidyl ether (140 g) and triphenylphosphine (10 g) were charged into a drum tumbler, and the mixture was treated in the same manner as described in Example 6. The reducing specific viscosity, tensile strength at break, tensile elongation at break, elastic modulus at tension and Izod impact strength of the resulting chips are shown in Table 4.

EXAMPLE 9

The polyester type block copolymer chips prepared in Preparation 1 (8 kg), polytetramethylene terephthalate ($\eta$sp/c=1.13) (2 kg), phenyl glycidyl ether (100 g), diethyleneglycol diglycidyl ether (70 g) and triphenylphosphine (10 g) were charged into a drum tumbler, and the mixture was treated in the same manner as described in Example 6. The reducing specific viscosity, tensile strength at break, tensile elongation at break, elastic modulus at tension and Izod impact strength of the resulting chips are shown in Table 4.

TABLE 4

| Ex. No. | $\eta$sp/c | Tensile strength at break (kg/cm$^2$) | Tensile elongation at break (%) | Elastic modulus at tension (kg/cm$^2$) | Izod impact strength (kg cm/cm) |
|---|---|---|---|---|---|
| 6 | 1.161 | 375 | 425 | 4670 | 8.8 |
| 7 | 1.314 | 467 | 415 | 4130 | 13.4 |
| 8 | 1.352 | 475 | 407 | 4000 | 16.7 |
| 9 | 1.458 | 405 | 520 | 1980 | 58.4 |

In order to compare the properties of the products of Examples 7 to 9 with the products to which no epoxy compound was added, the properties of the product of Example 2 and also the products which were prepared in the same manner as described in Example 2 except that a conventional stabilizer: Irganox 1010 ® (a phenolic stabilizer, manufactured by Ciba-Geigy) (30 g) or Naugard ® (an amine stabilizer, manufactured by Uniroyal Co.) (30 g) were added, were measured likewise. As a result, these latter products were inferior to the former products of Examples 7 to 9 particularly in Izod impact strength.

EXAMPLE 10

The chips prepared in Preparation 1, Examples 6, 7, and 8 were dried at 100° C. in vacuum and then were formed into a sheet (thickness: 2 mm) with hot-pressing. Dumbbell-shape test pieces were prepared from the sheet. The test pieces were kept in a gear oven at 140° C. for 12 days and thereafter subjected to heat aging test. The results are shown in Table 5. In the table, the retention of strength means the percent (%) of the tensile strength at break of the test piece after subjected to the heat aging test to that before the heat aging test. The retention of elongation is calculated likewise.

TABLE 5

| Example No. | Retention of strength (%) | Retention of Elongation (%) |
|---|---|---|
| Preparn. 1 | 55 | 41 |
| Example 6 | 78 | 95 |
| Example 7 | 93 | 100 |
| Example 8 | 100 | 100 |
| Example 9 | 96 | 100 |

In comparison purpose, the products obtained in Example 2 and also using a conventional stabilizer without incorporating an epoxy compound like in the above Table 4 were compared with the products of Examples 6 to 9 as to the heat aging test. As a result, the products containing no epoxy compound were inferior to the products of Examples 6 to 9 in the retention of elongation.

EXAMPLE 11

The same Dumbbell-shaped test pieces as prepared in Example 10 were kept in hot water of 100° C. for 5 days, and thereafter, the water resistance of the test pieces was measured, wherein the tensile strength at break and tensile elongation at break of the test pieces were measured before and after the hot water treatment and compared likewise. The results are shown in Table 6.

TABLE 6

| Example No. | Retention of strength (%) | Retention of Elongation (%) |
|---|---|---|
| Preparn. 1 | Broken (0) | Broken (0) |
| Example 6 | 54 | 67 |
| Example 7 | 74 | 85 |
| Example 8 | 86 | 90.4 |
| Example 9 | 71 | 83 |

In comparison purpose, the products obtained in Example 2 and also using a conventional stabilizer without incorporating an epoxy compound like in the above Table 4 were compared with the products of Examples 6 to 9 as to the water resistance. As a result, the products containing no epoxy compound were inferior to the products of Examples 6 to 9 in both of the retention of strength and the retention of elongation.

What is claimed is:

1. A polyester block copolymer composition which comprises (a) 2 to 95 parts by weight of a polyester block copolymer obtained by reacting a crystalline aromatic polyester and a monomeric lactone in a weight ratio ranging from 95/5 to 5/95 and (b) 98 to 5 parts by weight of a polytetramethylene terephthalate, and (c) wherein a mono- or more functional epoxy compound is incorporated in an amount of 0.2 to 10% by weight based on the total weight of the composition.

2. A polyester block copolymer composition as recited in claim 1 wherein the polyester block copolymer is obtained by reacting polytetramethylene terephthalate and monomeric ϵ-caprolactone.

3. A polyester block copolymer composition which comprises (a) 2 to 95 parts by weight of a polyester block copolymer obtained by reacting a crystalline aromatic polyester and a monomeric lactone in a weight ratio ranging from 95/5 to 5/95 and (b) 98 to 5 parts by weight of a polytetramethylene terephthalate, and (c)

wherein a mono-functional epoxy compound and a di- or more functional epoxy compound are incorporated in an amount of 0.1 to 5% by weight and 0.1 to 9.9% by weight, respectively, based on the total weight of the composition.

4. A composition according to claim 3, wherein the mono-functional epoxy compound is phenyl glycidyl ether and the di-functional epoxy compound is diethylene diglycidyl ether.

5. A polyester block copolymer composition as recited in claim 4 wherein the polyester block copolymer is obtained by reacting polytetramethylene terephthalate and monomeric ε-caprolactone.

* * * * *